(12) United States Patent
Schafer

(10) Patent No.: US 6,820,271 B2
(45) Date of Patent: Nov. 16, 2004

(54) COMPACT DISC STORAGE UNIT

(76) Inventor: Steve D. Schafer, 3430, 208th Street, Langley, British Columbia, V2Z 2C6 (CA)

(*) Notice: Subject to any disclaimer, the term of this patent is extended or adjusted under 35 U.S.C. 154(b) by 749 days.

(21) Appl. No.: 09/793,537

(22) Filed: Feb. 27, 2001

(65) Prior Publication Data

US 2001/0017825 A1 Aug. 30, 2001

(30) Foreign Application Priority Data

Feb. 28, 2000 (CA) .............................................. 2299775

(51) Int. Cl.[7] .............................................. G11B 17/24
(52) U.S. Cl. .................. 720/600; 369/30.79; 369/30.86
(58) Field of Search ....................... 720/600; 369/30.52, 369/30.56, 30.6, 30.62, 30.79, 30.8, 30.86, 30.91, 31.01

(56) References Cited

U.S. PATENT DOCUMENTS

| | | | |
|---|---|---|---|
| 2,952,463 A | 9/1960 | Vanderzee et al. | |
| 3,008,721 A | 11/1961 | Corbett, Jr. et al. | |
| 4,664,454 A | 5/1987 | Schatteman et al. | |
| 4,791,626 A | 12/1988 | Staar | |
| 5,031,164 A | 7/1991 | Rockola et al. | |
| 5,255,797 A | 10/1993 | Kos | |
| 5,615,184 A * | 3/1997 | Tsuruta et al. | ............ 369/30.86 |
| 5,777,957 A | 7/1998 | Lyman | |
| 5,953,293 A * | 9/1999 | Kajiyama et al. | ......... 369/30.86 |
| 6,169,713 B1 * | 1/2001 | Silverstein | ............... 369/30.79 |
| 6,590,842 B1 * | 7/2003 | Kajiyama et al. | ......... 369/30.86 |
| 6,603,715 B1 * | 8/2003 | Klein | ...................... 369/30.86 |
| 6,690,627 B2 * | 2/2004 | Fukushima et al. | ...... 369/30.86 |

FOREIGN PATENT DOCUMENTS

| | | | |
|---|---|---|---|
| JP | 9-82078 | * | 3/1997 |
| JP | 11-219559 | * | 8/1999 |

* cited by examiner

*Primary Examiner*—David Ometz
(74) *Attorney, Agent, or Firm*—Sean W. Goodwin; Linda M. Thompson

(57) ABSTRACT

A portable, fully enclosed compact disc storage apparatus or unit is provided which stores a multiplicity of discs, without risk of damage to their written surfaces. The storage unit comprises a two-part toroidal shaped housing, a circular magazine for supporting the discs, engaged on their unwritten edges by pairs of raised projections limited in height to that of the unwritten portion of a disc. A user-actuated lever engages the bottom of the discs and lift them from the magazine and out of the housing through an access slot. An indexing knob and notches means aligns a disc with the access slot and prevents unwanted rotation of the magazine relative to the housing between disc access and removal. A series of numbers are formed on the outer circumferential flanged edge of the magazine to aid in cataloging and identifying the magazine's contents.

20 Claims, 9 Drawing Sheets

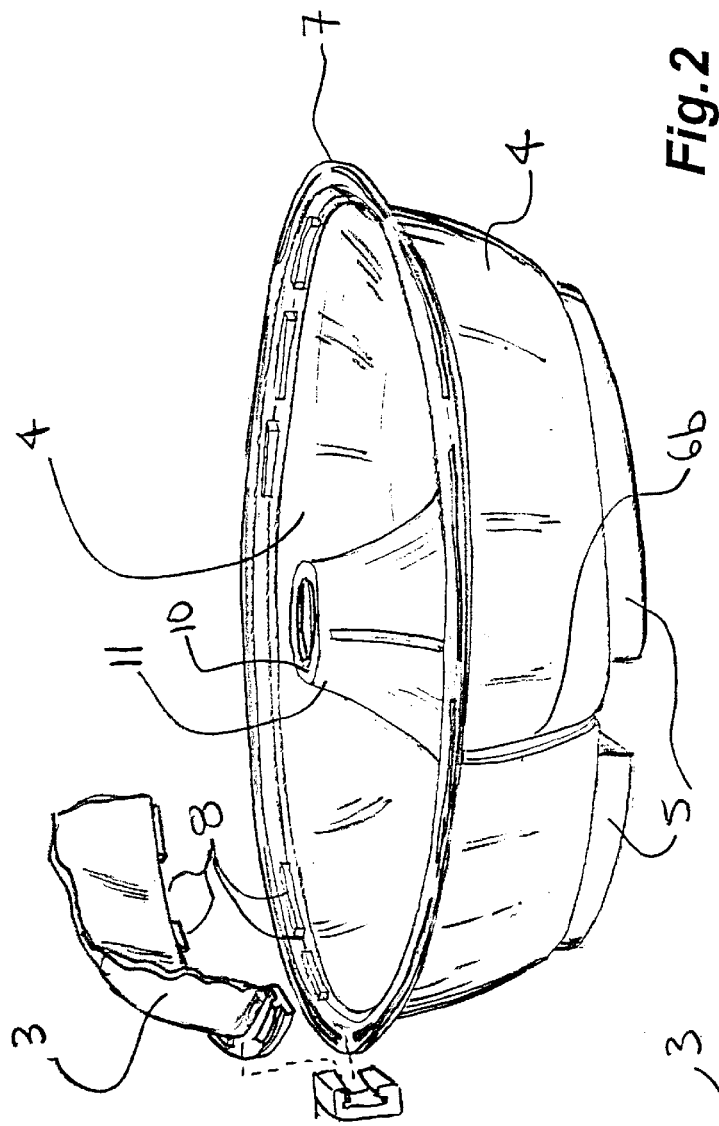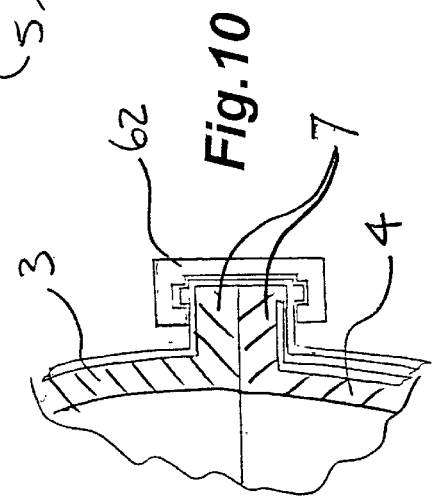

COMPACT DISC STORAGE UNIT

FIELD OF THE INVENTION

The invention relates to a portable apparatus for the storage of compact discs and more particularly to the storage of a multiplicity of compact discs within a single storage unit for the protection of their written surfaces.

BACKGROUND OF THE INVENTION

Compact discs ("CDs") are polycarbonate plastic discs having one or more layers of metal, capable of storing digital information. Most common are music CD's and CD-ROM's (CDR and CDRW) and Photo CD's.

It is critical that the discs be protected from scratching in order to maintain the information they store. Most discs, especially music CD's are retailed in crystal polystyrene cases, secured to the case at their central opening. Crystal polystyrene is highly brittle and the cases are easily damaged. Further storage of large numbers of these cases requires significant space and access to the discs is cumbersome and time consuming.

Ideally, CD's should be stored in compartments free from dust, where the only portion of the disc that comes in contact with the compartment and any device to remove the disc, is the unwritten edge of the disc.

It is known to store records and CD's in storage compartments capable of housing multiple CD's.

Often, CD's are removed from their original cases and placed inside multi-pocketed, fabric cases, lined with a soft material, for portable storage. Unfortunately, any dust or abrasive material present on the surface of the disc is scratched across the surface of the disc as it is inserted and removed from the case.

A number of different types of storage units or magazines currently exist. These range from stands which house CD's individually, stored in their original cases, to large circular magazines housed within CD players, capable of storing a multiplicity of CD's readily selectable by a selection mechanism within the player.

U.S. Pat. No. 2,952,463 to Vanderzee et al. teaches a record magazine in a toroidal form having records stored face to face, and radially disposed so as to form a complete circle or doughnut. Pairs of flanged circular discs serve as mounts for a plurality of U-shaped wire bails disposed between the individual records to serve as separators. The magazine rotates as a unit about a sleeve. The magazine of this invention is not portable, and the wire bails disposed between the records risk injury to CD's were they to be so applied.

U.S. Pat. No. 3,008,721 to Corbett Jr. et al teaches a record magazine mounted for rotation about a vertical axis having a series of radially disposed record-receiving pockets in which the individual records are carried on edge to extend radially of the axial center of rotation. The pockets are formed by the spaces between major and minor separation plates, one major plate on either side of each pair of facing records, the pair separated by a minor plate. The magazine rests upon an indexing plate having a series of ratchet teeth, one for each pocket and record. Again, the magazine of this invention is not portable, risks damage to a CD's written surface and does not facilitate hand selection.

U.S. Pat. No. 4,791,626 to Staar teaches a fixed magazine for records or discs having compartments located in a circular arrangement about a center axis. The discs are retained in the compartments by spring leaves. In this patent, the disc changer rotates rather than the magazine, however the magazine may be removed for wholesale change of its contents. The spring leaves used to separate the contents could potentially damage CD's.

U.S. Pat. No. 5,031,164 to Rockola et al. references earlier prior art to indicate that the magazine is toroidal and rotatable to selectively position a CD in an indexed position where it may be engaged by a gripper arm assembly. The CD's are stored in pockets having wire bails and pads to insulate the CD's from one another. The pads still contact the CD surface and often time can accumulate abrasive material which would risk damage to the CD.

Only U.S. Pat. No. 5,255,797 to Kos provides a portable carrier which deals specifically with protection of the circular semiconductor wafers it is designed to carry. The system involves a complex arrangement of cushioning devices to engage and provide pressure on the edge of the wafer at points adjacent the horizontal diameters of the wafer to prevent movement and damage within the carrier. The patent does not teach a rotatable mechanism for selection, nor does it teach a lifting device to enable convenient hand removal.

Another multi-compartmented storage device is described in U.S. Pat. No. 4,664,454 to Schatteman et al., wherein a complicated arrangement of V-shaped grooved members and multiple lever and securing arms are adapted to engage the edge of the disc and rotate it into and out of a series of compartments within a magazine, along an arcuate path defined by pins and slots and actuated by levers and springs. This storage device requires complex construction, especially when used in conjunction with a CD player or recording mechanism, and is neither portable nor inexpensive.

Other multiple storage compartments are described for use within automated CD players, many having mechanisms that select and rotate the disc into the player by touching the written surface of the disc. None of these units are designed to be portable and wholesale exchange of their contents is time consuming as access to the magazine is limited.

Clearly there is a need for a portable CD storage unit, that is simply constructed, engages discs solely at their unwritten edges for easy removal and insertion from the unit and allows easy wholesale exchange of the contents of the storage unit.

SUMMARY OF THE INVENTION

The current invention addresses the problems in the prior art disc storage units by providing a rotatable indexed magazine for disc storage housed within a fully enclosed portable storage unit and a user-actuated lifting magazine, for lifting the disc from the storage magazine and through a slot in the top housing. More particularly, the storage unit supports discs solely at their unwritten edges while being stored in the magazine, while being lifted from the magazine by the lifting mechanism and as they are guided through the lid slot.

In simple terms, the storage unit comprises a two-part separable toroidal shaped housing, a circular, rotatable magazine for disc storage, the magazine supporting disc only by their unwritten edges, an indexing means to align a disc for removal and a lifting mechanism to raise a disc out of the magazine and through a slot in the top housing, for grasping by the user.

More specifically, the housing is formed of two substantially identical halves which can be removeably clipped together, at a flange formed about the outer circumferential edge, to create a unitary, portable structure. Each housing half has radially extending slot formed thereon, a disc access slot on top, a lifting actuation slot on the bottom, and both of which are angularly aligned. Discs are held in a magazine, supported and rotatable on a pedestal, formed at the center of the housing. The magazine is comprised of a multiplicity of radially extending supporting members or spokes forming V-shaped slots therebetween at the base of the magazine through which the edges of the discs depend. A corresponding number of pairs of parallel, raised projections are formed on the inner and outer circumferential walls of the magazine, aligned with the V-shaped slots. The height of the projections is limited so as to support the edge of a disc solely at the unwritten portion.

A lifting mechanism is provided comprising a lever, pinned at a fulcrum outside the bottom housing and a lever actuation mechanism. An inner end of the lever is angled up towards the center of the pedestal of the bottom housing, extending through the bottom housing actuation slot where it is pinned to the actuation mechanism therein. An outer end of the lever arm extends radially outwards, under the V-shaped slots in the magazine, the outer end of the lever rising through the actuation slot in the bottom housing for raising a disc from the magazine to project out of the access slot, when actuated.

The lever actuating mechanism comprises a plunger and spring, the plunger extending downwards within the bore of a tubular knob located at the center of the magazine, its lower end pinned to the lifting mechanism's lever arm. The spring is sandwiched between a circular button at the top of the plunger and the magazine. Downward pressure on the button top of the plunger actuates the lever arm and when released, the spring returns the plunger upwardly to its original position within the bore.

The magazine, rotated by turning the knob at its center, has notches formed on is underside, each notch aligned with a pair of raised projections, a V-slot and thus a disc. Optionally, numbers can be added to the outer edge of the magazine, aligned with each disc, for identification and indexing purposes.

A locking arm is pivotally attached at the base of the housing, aligned with the bottom housing slot and extending through the bottom housing slot to cooperate with the notches on the magazine to limit rotation, during disc removal. The locking arm can be release from the notches by pressing the top of the arm which causes the locking arm to rotate outwardly from its pivot at its pinned end, freeing its inner edge from the notches in the magazine, allowing the magazine to rotate freely.

Therefore, in a broad aspect of the invention, apparatus is provided for storage and indexed retrieval of multiple data storage discs having unwritten peripheral edge portions, comprising semicircular toroidal-shaped top and bottom housings; the top housing having a radially extending disc access slot formed therein; a semicircular toroidal magazine rotatably supported within the bottom housing and having a multiplicity of corresponding and radially spaced inner and outer pairs of projections for supporting a multiplicity of angularly spaced discs within the magazine, the projections being limited in height so as to engage a disc solely at its unwritten edge; means for indexing the magazine relative to the access slot for aligning a disc in the magazine therewith; and means for lifting a disc from the magazine's projections and through the access slot.

BRIEF DESCRIPTION OF THE DRAWINGS

FIG. 2 is a perspective view of the bottom housing showing the mated alignment projections on 180° of an outer circumferential flange;

FIG. 10 is a view of the flange of the top and bottom housing clipped together with a C-clip.

DESCRIPTION OF THE PREFERRED EMBODIMENT

Figure 1A:
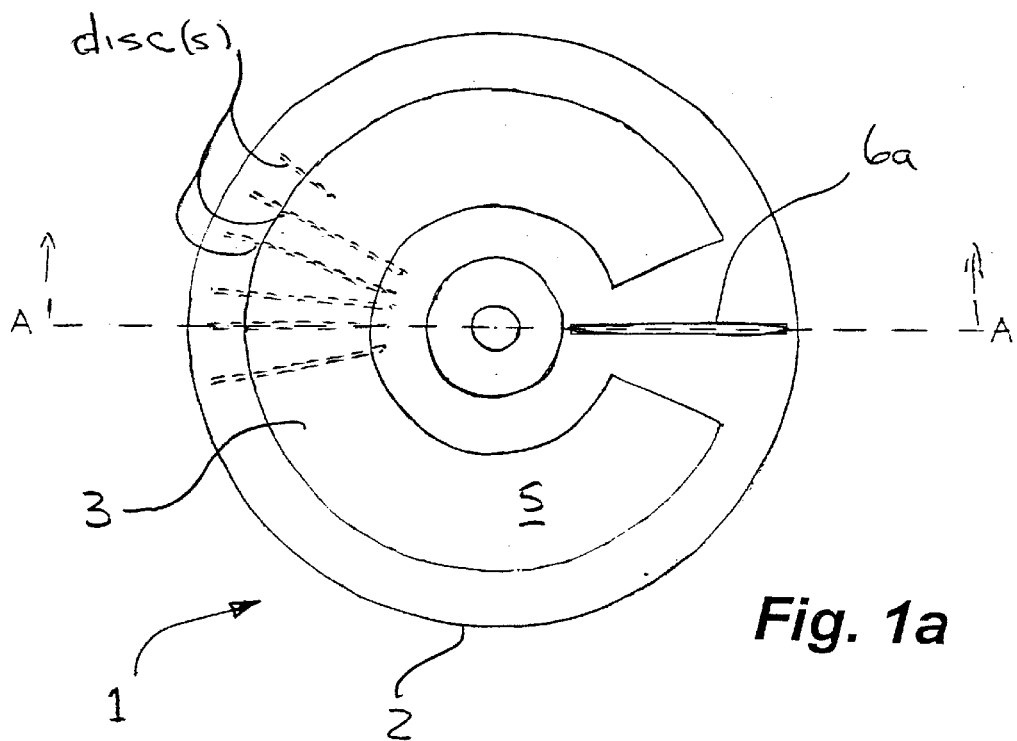
FIG. 1a is a top plan view of the housing.

A storage unit 1 is provided for storing a multiplicity of CD or discs in numbers of about 72. The storage unit 1 comprises a housing 2, a rotatable magazine 9 for supporting discs within the housing 2, a means or mechanism 20 for lifting discs from the magazine 9 and out of the housing 2, a means or mechanism 23 for actuating the lifting mechanism 20, an indexing means 40 for aligning the disc with the lifting mechanism 20 and a locking mechanism 50 for preventing relative rotation of the magazine 9 and housing 2 during disc removal.

The Housing

Figure 1B:
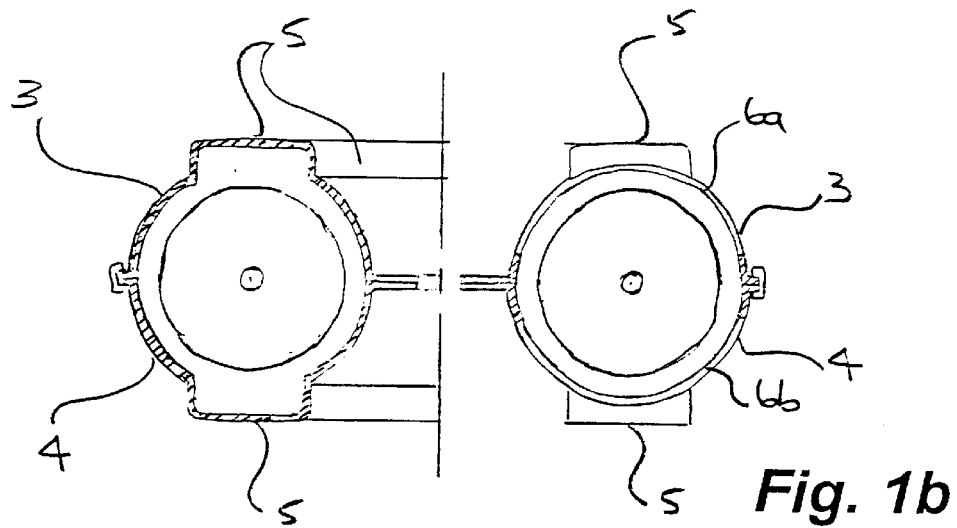
FIG. 1b is a cross-sectional view of the housing, without the magazine, as viewed through section A—A of FIG. 1a. The background has been omitted in the sectional view right of the axis.

Having reference to FIGS. 1a-1b, the disc storage unit 1 is shown comprising a two-part, toroidal shaped housing 2, having a top semi-circular toroidal housing 3 and a bottom semi-circular toroidal housing 4. More specifically, the top and bottom housings 3, 4 are substantially symmetrical and have penannular raised flattened portions 5 formed about the apex of each semi-circular toroidal housing 3, 4. The circular section of the toroid is sized appropriately for a compact disc or CD. A radial access slot 6a is formed in the top housing 3, sized for the thickness and diameter of a disc. The access slot 6a extends from about the top housing's inner edge to its the outer edge. An actuating slot 6b is formed in the bottom housing 4. The slots 6c, 6b are located angularly, at a point between the ends of the raised flattened portions 5. The housing slots 6a, 6b, formed in this fashion, do not extend completely radially through the housings 3,4, leaving the structures intact as circular elements. Further, the width of the access slot 6a converges at either end to minimize lateral movement of a disc once it is engaged in the slot 6a.

Optionally, a press fit insert (not shown) can be fitted to the top housing slot 6a so as to modify the access slot, causing it to converge at the disc edges and provide edge guides which converge downwardly and inwardly into the top housing 3 to guide discs in an out of the magazine 9.

As shown in FIGS. 2 and 10, an outer flange 7 is formed about each of the outer rim of the top housing 3 and the bottom housing 4, the flange 7 having mated alignment projections and spaces 8 formed about each flange 7 to ensure proper angular alignment or orientation of the top access and bottom actuating slots 6a, 6b. The complementary projections and notches 8 are aligned and the top and bottom housings 3,4 are clipped together with C-clips 62, clipped about the aligned outer flanges 7 as shown in FIG. 10, to form a single housing 2.

The Magazine

Figure 3:
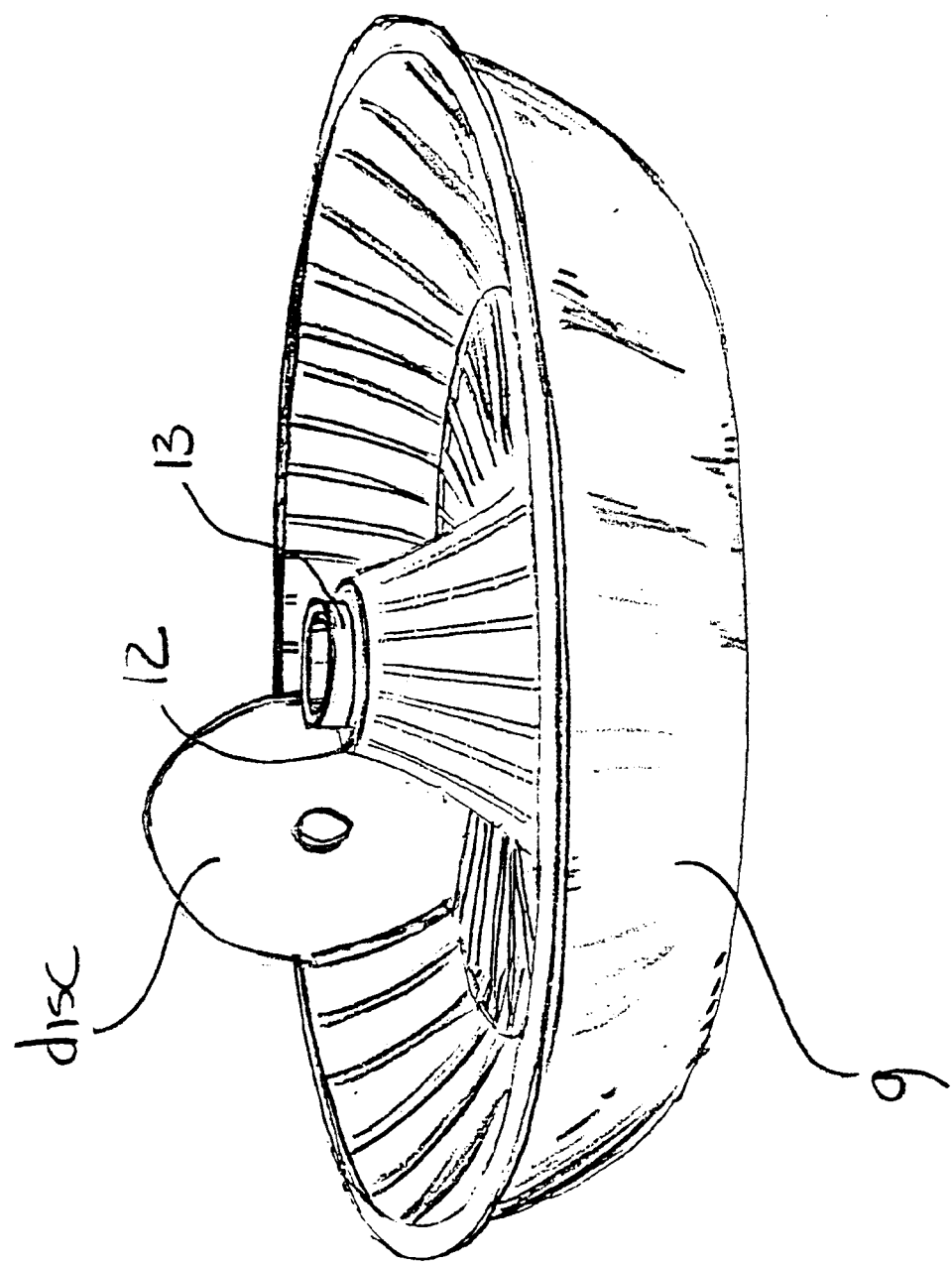
FIG. 3 is a perspective view of the magazine.

The invention further comprises a semi-circular, toroidal magazine 9, as shown in FIG. 3, which rests rotatably within the bottom housing 4 and cooperates with the disc lifting mechanism 20, for enabling elevation of the disc out of the magazine 9 and through the top housing slot 6a for grasping and removal by the user.

More particularly and having reference again to FIG. 2 and 3, an inner housing flange 10 of the bottom housing 4 forms a pedestal 11. An inner flange 12 is formed about the inner circular edge of the magazine 9, which is rotatably supported on the bottom housing pedestal 11. The inner magazine flange 12 further supports, at its center, a tubular inset 13, shown in FIG. 4, for supporting the actuation mechanism 23, described in greater detail later.

An indexing flange 14 is formed at the outer peripheral edge of the magazine 9 and is smaller in diameter than the top 3 and bottom 4 housing outer flanges 7, thereby allowing the magazine 9 to rotate freely within the bottom housing 4.

Figure 4:
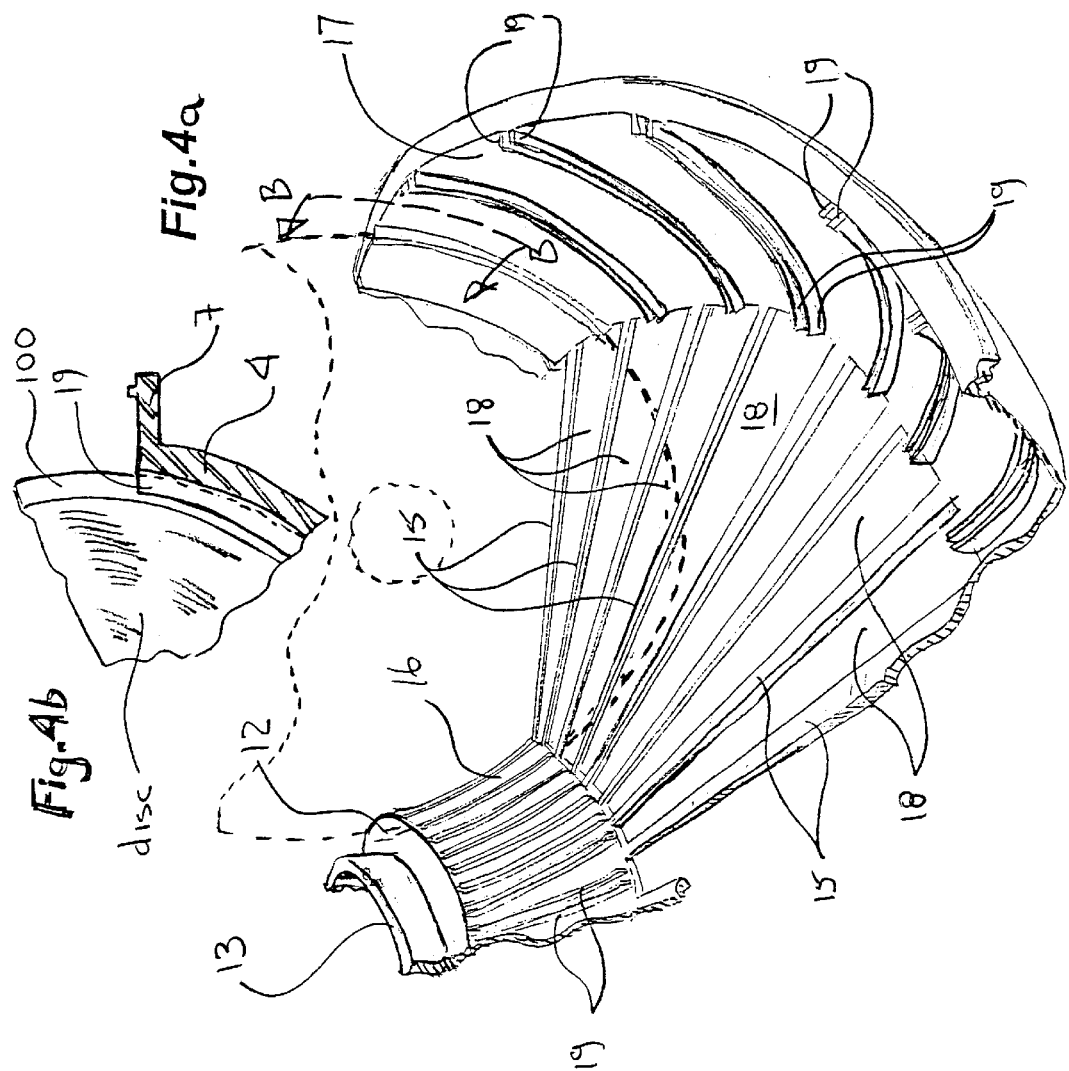
FIG. 4a is a pie-shaped perspective and cut away view of the magazine showing the spaced raised disc supporting projections and the V-slots.
FIG. 4b is a partial cross-sectional view of a portion of the magazine and a disc illustrating the interaction of the projections and a disc.

The magazine, as shown in FIG. 4, further comprises a plurality of radially extending supporting members 15, which join an inner circumferentially extending wall 16 to an outer circumferentially extending wall 17. The supporting members 15 are spaced apart from one another, defining radially extending and outwardly widening V-shaped access slots 18. Side by side pairs of raised and parallel projections 19 are formed on the circumferential inner 16 and outer 17 walls, aligned with the center of each V-slot 18. The projections 19 are limited in height for engaging a disc solely at its unwritten edge 100 and projection pairs are spaced apart sufficient to retain the disc's edge and limit lateral movement.

The Lifting Mechanism

Figure 5:
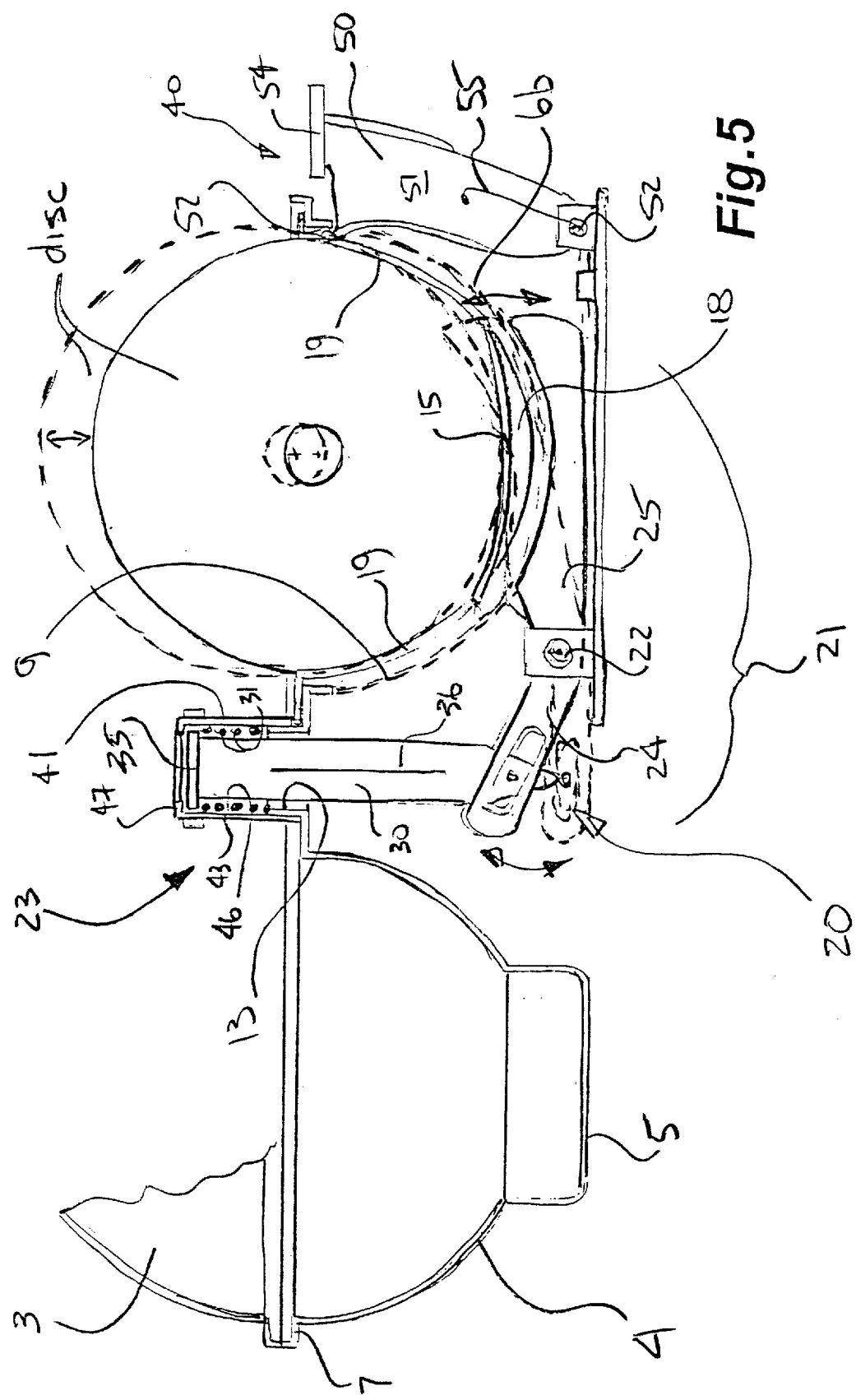
FIG. 5 is a cross-sectional view of the bottom housing, the lifting mechanism, baseplate and locking mechanism with respect to the housing bottom.
Figure 6:
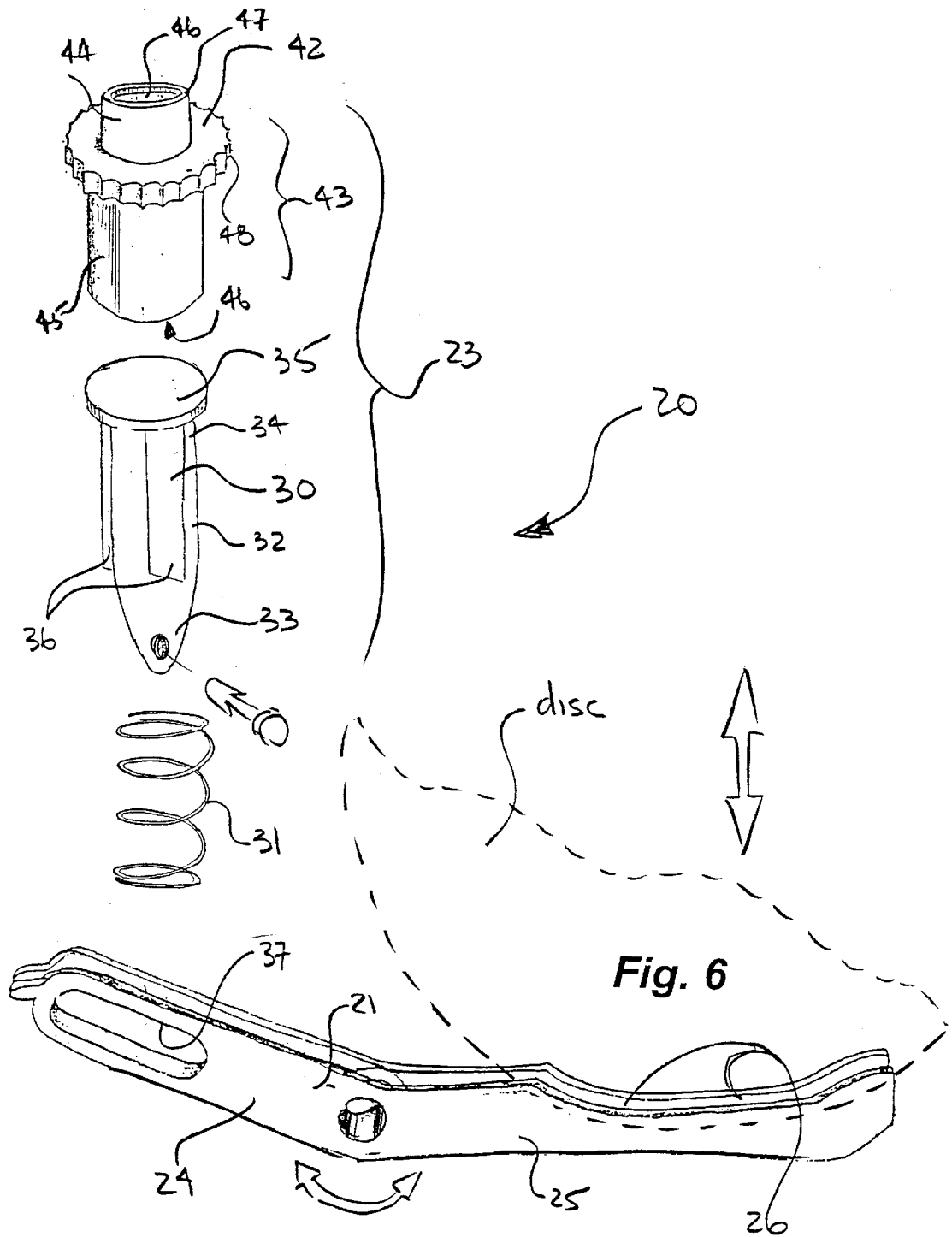
FIG. 6 is an exploded view of the actuation mechanism, showing the lever arm, the spring, the plunger and the indexing knob.

Having reference to FIG. 5, the lifting mechanism 20 comprises a lever arm 21, a fulcrum 22 and an actuating mechanism 23. An inward portion of the lever arm 24 extends radially inward from the pinned fulcrum 22 to the pedestal 11 of the housing bottom 4. An outward portion of the lever 25 extends radially outward and beneath the V-shaped slots 18 in the magazine 9. The length of the inward portion 24 is shorter than the outward portion 25, for magnifying the actuation movement. The inner lever 24 is angled upward from the pinned fulcrum 22 to permit downward deflection. As shown in FIG. 6, the outer lever 25 has a groove 26 formed along an upper edge 27, oriented adjacent and facing the bottom of the magazine 9, so as to engage and support the edge of a disc when lifted from the magazine 9. Further, the upper edge 27 of the outer lever arm 25 is slightly concave in shape to correspond with the edge of the disc, providing contact and support to a greater percentage of the disc edge.

Having reference to FIG. 6, the lever actuating mechanism 23 comprises a plunger 30 and spring 31 fitted within the tubular insert 13 at the center of the magazine 9. The plunger 30 comprises a structurally finned body 32 having a pointed lower end 33 a flat circular button 35 is formed on the plunger's upper end 34, supported by the fins 36 of the body 32. The lower end of the plunger 30 is pinned in a slot 37 at the proximal end of the inner lever arm 24.

As the plunger 30 is depressed, the lever arm 21 pivots at the pinned fulcrum 22, causing the outer end of the lever arm 25 to raise up into the bottom housing slot 6b, engaging and lifting a disc from it's V-shaped magazine slot 18. The disc is lifted upwards through the top housing slot 6a where it projects sufficiently to be removed from the storage unit 1, by grasping the unwritten edges 100 on either side of the disc.

Indexing Means

Figure 7:
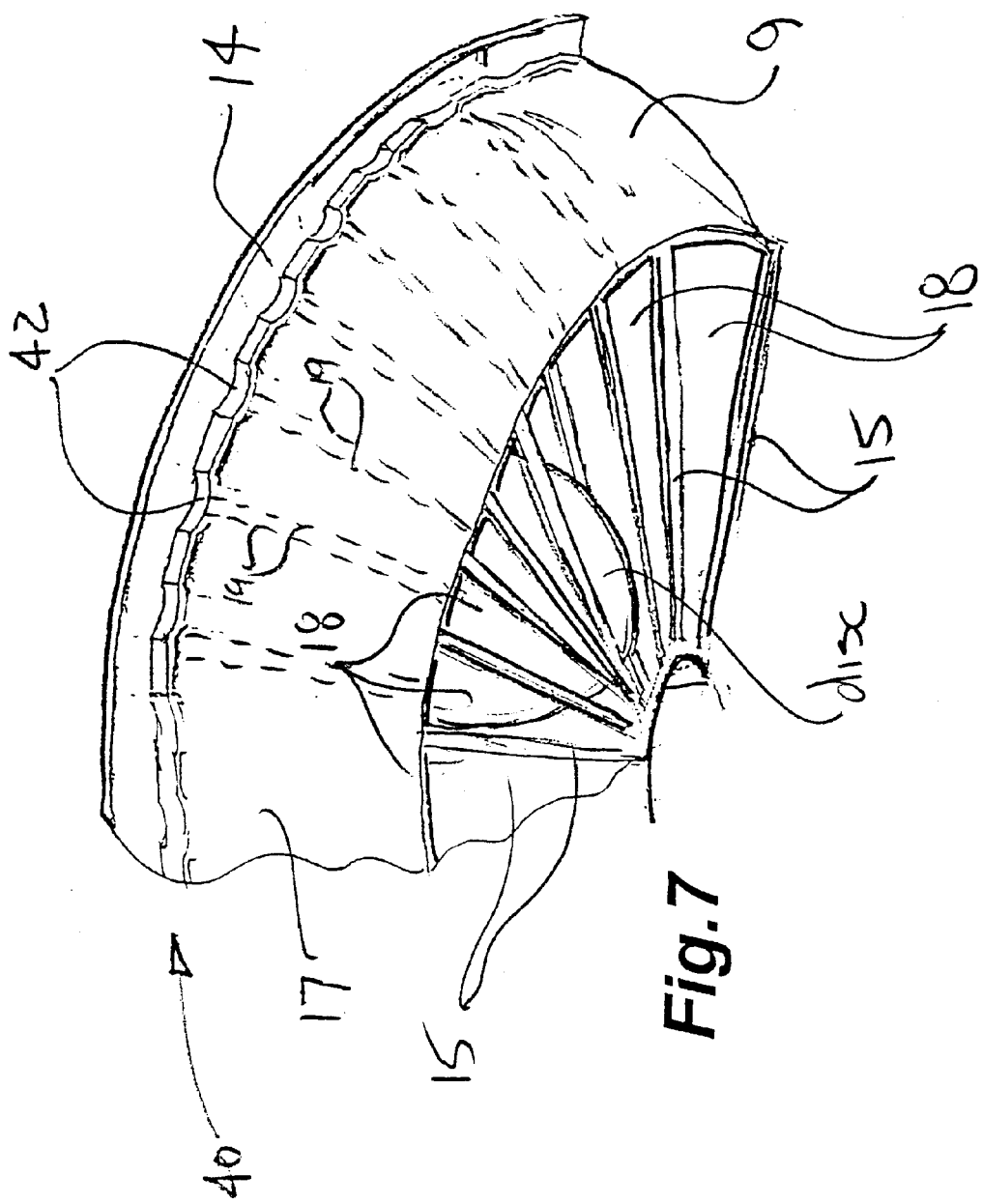
FIG. 7 is an upward, perspective view of the underside of the magazine showing the indexing notches.

In a preferred embodiment of the invention, an indexing means 40, shown in FIGS. 5-7, is provided to assist in selecting a particular disc from the multiple discs stored in the unit 1 and align it with the slots in the housing 6 and with the lifting mechanism 20. As shown in FIG. 5, the indexing means 40 comprises an axial knob 41, used to rotate the magazine 9, a series of notches 42 on the underside of the magazine 9 and a locking mechanism 50 for limiting unwanted rotation of the magazine 9 once the disc is aligned for removal from the housing 2.

The knob 41 comprises a tube 43 having an upper 44 and lower 45 end and a bore 46 slightly larger in diameter than the tubular insert 13 in the magazine 9. The bore 46 is partially closed at its upper end by an annular lip 47. The spring 31 of the actuation mechanism 23 is placed over the body of the plunger 32 and both are inserted into the bore of the knob 46, the top button 35 of the plunger 30 residing below and restrained by the annular lip 47. The knob 41 is fitted over the tubular insert 13 in the center of the magazine 9, the plunger 30 extending into the housing 2 through the bore in the insert 13. The spring 31 is sandwiched between the top of the tubular insert 13 and the annular lip 47 for biasing the plunger upwards. The plunger 30 is free to move within the tubular knob's bore 46. The knob 41 is grasped by the user and rotated, causing the magazine 9 to rotate. Preferably, a serrated collar 48 is formed intermediate the knobs ends 44,45 and closer to the upper end 44 to provide a better gripping surface for the user.

As shown in FIG. 7, the notches 42 formed at the underside of the magazine are below the indexing flange 14. Each notch 42 corresponds to a pair of disc projections 19 on the outer circumferential wall 17, and in so doing, provides means to align the V-slot 18 with the top housing slot 6a and the lifting mechanism 20.

Figure 8:
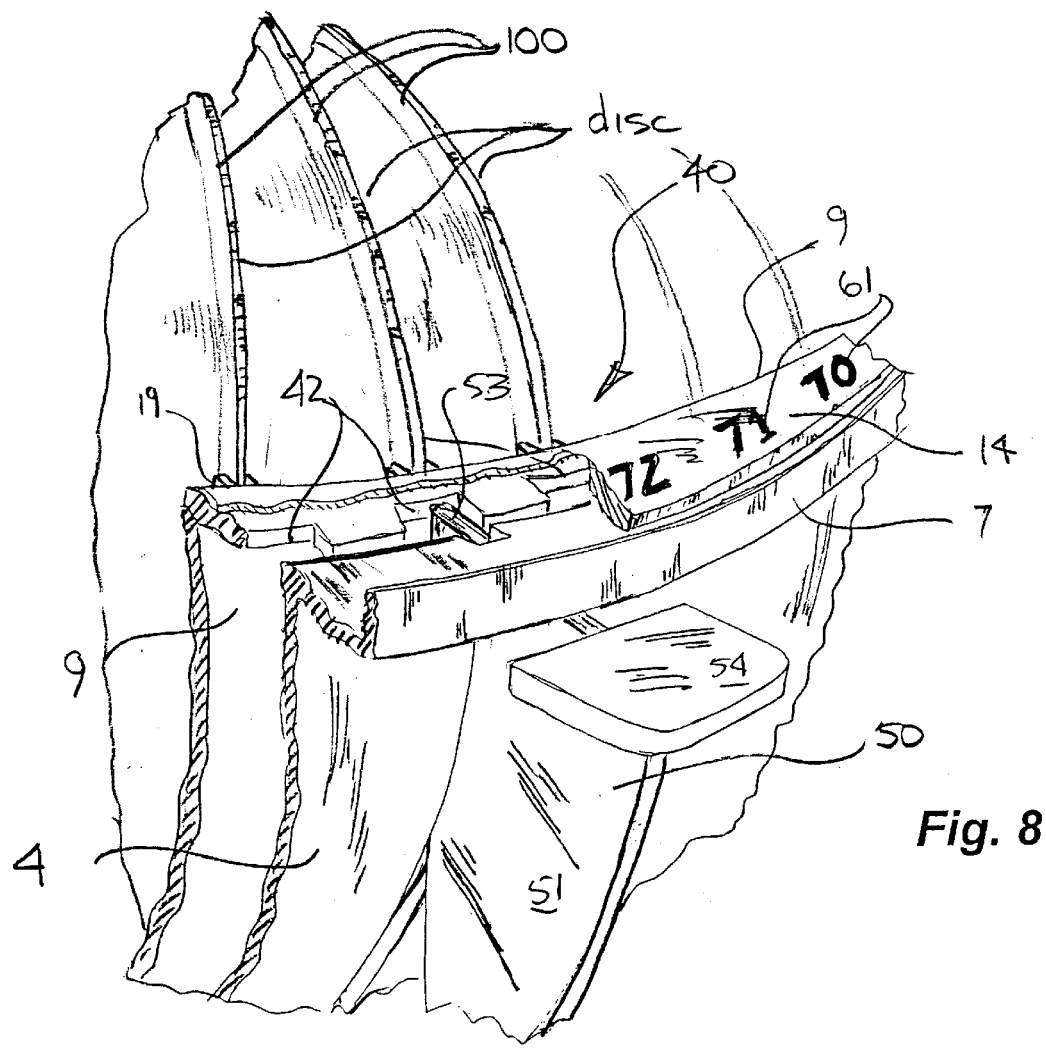
FIG. 8 is a partial perspective view of the locking arm engaged in the bottom housing's actuation slot. The indexing flange is cut away to better illustrate the inner edge of the vertical locking arm engaging the indexing notches.

The locking mechanism 50 comprises a vertical locking arm 51 and a pinned pivot 52. The vertical locking arm 51 as shown in FIG. 5 is pinned at a pivot 52 at the outer circumferential wall of the bottom housing 4, aligned with the bottom housing slot 6b. As shown in FIG. 8, an inner edge of the locking arm 53 extends within the slot 6b for engaging the notches 42 on the underside of the magazine 9. A horizontal button surface 54 attached to an upper, outer edge of the locking arm 51 extends outside the housing 2. Downward pressure, applied to the locking arm button 54, radially disengages the arm's inner edge 53 from the notch 42 on the magazine 9 as the vertical locking arm 51 rotates slightly outward, about the pivot 52. The magazine 9 is then free to rotate. The magazine can then be rotated by turning the knob 41. Once pressure is released from the locking arm button 54, a spring 55 biases the locking arm 51 to move slightly radially inward to engage one of the notches 42 on the magazine 9. As the magazine notches 42, projections 19 and V-slots 18 all correspond, the user must ensure that the locking mechanism 50 engages a notch 42 to ensure proper alignment for removal of a disc.

Figure 9:
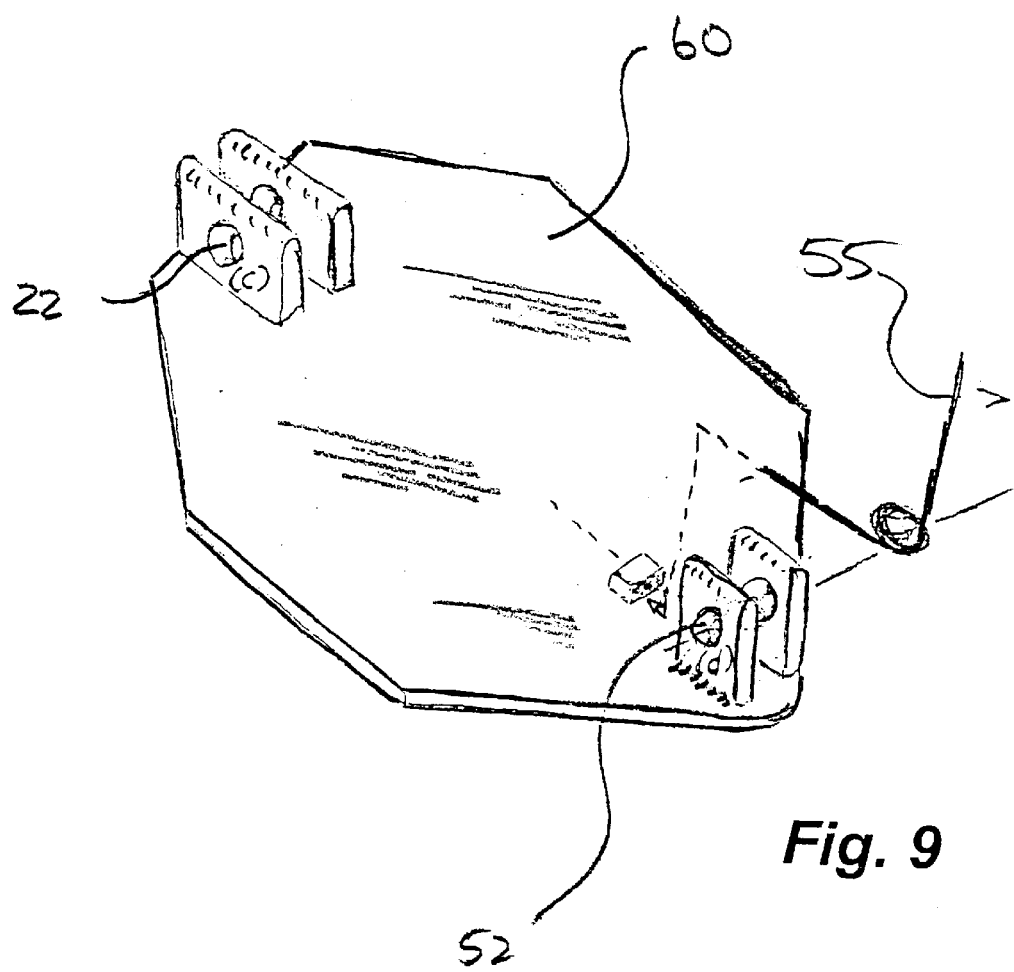
FIG. 9 is a perspective view of the baseplate.

Preferably, for ease of manufacture, a baseplate 60, as shown in FIG. 9, is fixed to the outside of the bottom housing 4 (FIG. 5) to provide a unitary structure for attachment of the lifting mechanism fulcrum 22 and the vertical locking arm pivot point 52, between the ends of its raised flattened portions 5, to correspond with the slot 6b formed thereon, as shown in FIG. 5.

Optionally, as shown in FIG. 8, a series of raised numerals 61 can be formed on the indexing flange 14 of the magazine 9, aligned with each set of projections 19, to assist with cataloguing the contents of the magazine.

In a preferred embodiment of the invention, the housing 2 is made from injection molded, polycarbonate plastic which may be clear or opaque and is extremely durable and resistant to breakage. Other components are molded from ABS plastic.

Operation

Best shown in FIG. 5, discs are loaded into the magazine 9 in the bottom of the housing 4, placed vertically on edge between each pair of projections 19, their lower edges depending through the V-slots 18 in the base of the magazine 9. Discs can be loaded into the magazine 9 either with the top housing 3 off, or one by one through the top housing slot 6a. If apart, the top housing 3 is placed onto the bottom housing 4. The mated projections and spaces 8 are aligned and the two housing pieces removeably clipped together with C-clips 62.

The locking arm button 54 is depressed to disengage the locking arm 51 from the notches 42 on the base of the magazine 9 at the same time the user grasps and rotates the knob 41, causing the magazine 9 to rotate freely until the desired disc is aligned with the top housing slot 6a. The locking arm button 54 is released for engaging the locking arm 51 with the notch 42 in the base of the magazine 9 corresponding to the selected disc.

The user exerts pressure downward on the top button 35 of the plunger 30, causing it to move downward within the bore of the knob 41, compressing the spring 31 and actuating the lever arm 21 (Dashed lines). As the lever arm 21 pivots about fulcrum 22, the plunger tip 33 is able to move axially within the slot 37 in the lever arm 21, allowing maximum downward deflection of the inner lever 24. The outer lever 25 rises through the bottom housing slot 6, engaging the edge of the disc in the groove 26 in its upper edge 27, lifting it upward out of the V-slot 18 and through the top housing slot 6a, where it can be accessed by the user. The disc can now be removed by the user by grasping the disc at its opposing, unwritten edges 100, between the thumb and forefinger.

When pressure on the plunger 30 is released, the spring 31 decompresses and the plunger 30 is pushed up within the bore of the knob 41 and insert 13, to its original position, causing the lever arm 21 to return, as well, to its original or non-actuated position (Solid lines) so that the magazine 9 can be repositioned.

Discs can be replaced into the magazine 9, without removing the top housing 3 by a reversal of this same process.

Wholesale exchange of discs within the magazine 9 can be made, at any time, by removing clips 62, removing the top housing 3 and manually exchanging the discs.

The embodiment of the invention for which an exclusive property or privilege is claimed are defined as follows:

1. A disc storage and retrieval apparatus for storage of multiple data storage discs having unwritten peripheral edge portions, comprising:

(a) a semicircular toroidal-shaped bottom housing;
(b) a semicircular toroidal-shaped top housing removeably secured to the bottom housing for forming a toroid, the top housing having a radially extending disc access slot formed therein;
(c) a semicircular toroidal magazine rotatably supported within the bottom housing and having a multiplicity of corresponding and radially spaced inner and outer pairs of projections for supporting a multiplicity of discs within the magazine, the projections being limited in height so as to engage the discs solely at their unwritten edges;
(d) means for indexing the magazine relative to the access slot for aligning a selected disc in the magazine therewith; and
(e) means for lifting the selected disc disc from the magazine's projections and through the access slot.

2. The apparatus of claim 1 wherein the bottom housing has an actuating slot formed therein and the means for lifting a disc from its unwritten edge comprises means which operate through the actuating slot.

3. The apparatus of claim 2 further comprising means for actuating the lifting means.

4. The apparatus of claim 3 wherein the lifting means comprises:

(a) a push button located at the axis of the top and bottom housings;
(b) a lever extending radially from the housings' axes to the actuating slot and pivotally connected to the push button; and
(c) means for biasing the lifting means so that it does not interfere with the magazine.

5. The apparatus of claim 4 wherein the lever arm has an inward portion and an outward portion, the inward portion being shorter than the outward portion for increasing the lifting ratio.

6. The apparatus of claim 5 further comprising a baseplate secured top the bottom housing and wherein the lever arm is pivoted therefrom.

7. The apparatus of claim 2 wherein:

(a) the bottom housing forms a pedestal at its inner radius; and
(b) the magazine forms a complementary inner flange, the magazine's inner flange being supportable on the pedestal for enabling rotation of the magazine.

8. The apparatus of claim 2 further comprising means for angularly orienting the top and bottom housings so as to align the access slot above the actuating slot.

9. The apparatus as described in claim 8 wherein the housing alignment means comprise complementary projections and notches formed about the periphery of each of the top and bottom housings.

10. The apparatus of claim 1 wherein the access slot converges at its radially inward and outward edges to ensure disc and slot contact occurs only at the disc's unwritten edge.

11. The apparatus of claim 10 wherein the radially inward and outward edges of the access slot have downwardly depending guides to constrain lateral movement of the disc moving therethrough.

12. The apparatus of claim 1 wherein the semicircular toroidal magazine comprises an inner circumferentially extending curved wall and an out circumferentially extending curved wall, the inner and outer walls being joined by a multiplicity of radially extending supporting spoke members, V-slots being formed between adjacent spoke members.

13. The apparatus of claim 12 wherein:
(a) at least one inner pair of projections are formed on the inner wall; and
(b) at least one outer pair of projections are formed on the outer wall.

14. The apparatus of claim 13 wherein the lifting means extend through the V-slot to engage a disc when actuated.

15. The apparatus of claim 1 wherein the indexing means comprises:
(a) a tubular knob at the inner radius of the magazine and extending upwardly and rotatably through the top housing;
(b) a multiplicity of indexing notches spaced about the outer radial periphery of the magazine, one notch for each pair of inner and outer projections; and
(c) a locking arm for alternately engaging and disengaging the notches on the magazine so that when disengaged, rotation of the knob can rotate the magazine, and when engaged with an indexing notch, the magazine is locked with a disc aligned with the access slot in the top housing.

16. The apparatus of claim 15 wherein the locking arm is pivotally mounted relative to the bottom housing and is biased for engaging the indexing notches.

17. The apparatus of claim 15 wherein the locking arm is movable into and out of the bottom housing for engaging and disengaging a notch.

18. A disc storage and retrieval apparatus for storage of multiple data storage discs having unwritten peripheral edge portions, comprising:
(a) a semicircular toroidal-shaped bottom housing;
(b) a semicircular toroidal-shaped top housing removably secured to the bottom housing for forming a toroid, the top housing having a radially extending disc access slot formed therein;
(c) a semicircular toroidal magazine rotatably supported within the bottom housing and having a multiplicity of corresponding and radially spaced inner and outer pairs of projections for supporting a multiplicity of discs within the magazine, the projections being limited in height so as to engage the discs solely at their unwritten edges;
(d) a rotary mechanism which rotates the magazine relative to the access slot and aligns a selected disc in the magazine therewith; and
(e) a radially extending lever which pivots to contact the selected disc and lift the disc from the magazine's projections and up through the access slot.

19. A method of storing and retrieving compact discs, the method comprising the steps of:
providing a magazine which stores a plurality of compact discs wherein each disc is individually retained at its edges by pairs of shallow projections, the magazine being housed in a generally toroidal housing;
rotating the magazine so as to align a selected compact disc with an access slot in a top portion of the housing;
actuating a lever through an actuating slot formed in a bottom portion of the housing so as to lift the compact disc from the magazine and upwardly through the access slot; and
removing the compact disc through the access slot.

20. The method of claim 19 further comprising the step of indexing the magazine to align another compact disc for removal through the access slot.

* * * * *